United States Patent
Yan et al.

[11] Patent Number: 5,827,146
[45] Date of Patent: Oct. 27, 1998

[54] DUAL TRANSMISSION FOR MOTORCYCLES

[75] Inventors: Hong-Sen Yan, Tainan; Kuen-Bao Sheu, Chang Hua Hsien, both of Taiwan

[73] Assignee: Kwang Yang Motor Co., Ltd., Kaohsiung, Taiwan

[21] Appl. No.: 588,333

[22] Filed: Jan. 18, 1996

[51] Int. Cl.$^6$ ................................ F16H 37/02
[52] U.S. Cl. .................. 475/210; 475/211; 475/208; 180/230
[58] Field of Search ................ 475/208, 210, 475/211, 207; 180/219, 230

[56] References Cited

U.S. PATENT DOCUMENTS

| | | | |
|---|---|---|---|
| 2,076,926 | 4/1937 | Timmermann | 475/211 |
| 3,605,522 | 9/1971 | Grosseau | 475/210 X |
| 3,850,050 | 11/1974 | Lemmens | 475/211 X |
| 4,083,421 | 4/1978 | Van Horn et al. | 180/230 X |
| 4,402,237 | 9/1983 | Tomlinson | 475/211 X |
| 4,589,303 | 5/1986 | Roberts | 475/211 |
| 4,599,916 | 7/1986 | Hirosawa | 475/210 |
| 4,644,820 | 2/1987 | Macey et al. | 475/211 |
| 4,671,134 | 6/1987 | Luo | 180/230 X |
| 4,887,488 | 12/1989 | Miyazaki | 180/230 X |
| 5,114,386 | 5/1992 | Csotonyi | 475/211 |
| 5,152,361 | 10/1992 | Hasegawa et al. | 180/230 |

*Primary Examiner*—Charles A. Marmor
*Assistant Examiner*—Peter T. Kwon
*Attorney, Agent, or Firm*—Jacobson, Price, Holman & Stern, PLLC

[57] ABSTRACT

A dual transmission including a fixed gear ratio planetary gear mechanism, a belt transmission mechanism capable of continuously changing speed ratio, at least one clutch, and a lock, wherein the engine power of the motorcycle is transmitted through the planetary gear mechanism to the power output shaft for a fixed gear ratio transmission, and then controlled by the clutch and the lock to be transmitted to the power output shaft in the two routes, respectively, through the planetary gear transmission mechanism and the power-split continuously variable transmission mechanism.

11 Claims, 6 Drawing Sheets

FIG. 6

| TRANSMISSION MODE / CLUTCH | 250 | 360 | 310 |
|---|---|---|---|
| FIRST GEAR FIXED GEAR RATIO | X | | |
| SECOND GEAR FIXED GEAR RATIO | | X | |
| POWER-SPLIT CONTINUOUSLY VARIABLE TRANSMISSION | | | X |

X : means the clutch is connected

FIG. 7

| TRANSMISSION MODE / CLUTCH | 54 | 56 | 53 |
|---|---|---|---|
| FIRST GEAR FIXED GEAR RATIO | X | | |
| SECOND GEAR FIXED GEAR RATIO | | X | |
| POWER-SPLIT CONTINUOUSLY VARIABLE TRANSMISSION | | | X |

X : means the clutch is connected

DUAL TRANSMISSION FOR MOTORCYCLES

BACKGROUND OF THE INVENTION

The present invention relates to the transmission of a motorcycle, and relates more particularly to a dual transmission which provides a fixed gear ratio transmission mode and a power-split continuously variable transmission mode.

Regular motorcycle transmissions include two types, namely, the fixed gear ratio transmissions of changing the ratio of number of teeth, and the V-belt continuously variable transmissions. The fixed gear ratio transmissions are reliable, durable, and efficient Because of limited number of gears, the engine power of a motorcycle of fixed gear ratio transmission cannot be continuously transmitted to the wheels. Therefore, a motorcycle of fixed gear ratio transmission is more difficult to control and less comfortable to ride. In comparison with the fixed gear ratio transmissions, the V-belt continuously variable transmissions are simple and less expensive, and easy to control. However, a V-belt continuously variable transmission is not durable in use because the V-belt wears quickly with use. Furthermore, the performance of a continuously variable transmission is low, more particularly at the starting or a low speed mode.

SUMMARY OF THE INVENTION

The present invention has been accomplished to provide a dual transmission for motorcycles which eliminates the aforesaid drawbacks. When at the start or during a low speed mode, the power transmission is performed through a high-performance gear transmission. When at a high speed mode, the power transmission is executed through a power-split continuously variable transmission. Therefore, the dual transmission provides the advantages of both the continuously variable transmission and the fixed gear ratio transmission. According to the present invention, the dual transmission comprises a planetary gear mechanism, and a belt transmission mechanism capable of continuously changing speed ratio (see FIG. 1). When the motorcycle is initially started, the output power of the motorcycle engine is transmitted through the planetary gear mechanism to the output shaft. When at a high speed mode, the output power of the motorcycle engine is transmitted, by means of the operation of a clutch and a lock, in two routes respectively through the planetary gear mechanism and the belt transmission mechanism. Therefore, the present invention achieves the fixed gear ratio transmission mode and the power-split continuously variable transmission mode.

BRIEF DESCRIPTION OF THE DRAWINGS

The present invention will now be described by way of examples with referenced to the annexed drawings, in which:

FIG. 6 shows the operation modes of the clutches and the lock means of the dual transmission shown in FIG. 4; and FIG. 7 shows the operation modes of the clutches and the lock means of the dual transmission shown in FIG. 5.

DETAILED DESCRIPTION OF THE PREFERRED EMBODIMENTS

A dual transmission in accordance with the present invention provides a fixed gear ratio transmission mode and a power-split continuously variable transmission mode, and is comprised of a planetary gear mechanism, a belt transmission mechanism capable of continuously changing speed ratio, a clutch, and a lock means. The planetary gear mechanism comprises a sun gear, at least two planet gears, a planet gear arm, and an internal gear. By coupling the sun gear, the planet gear arm, and the internal gear between the power output shaft and the power input shaft or fixing them to the motorcycle frame, different speed ratios can be arranged. If either two members of the sun gear, the planet gear arm, and the internal gear are coupled together, the planetary gear mechanism is fastened together, and the speed ratio is 1:1.

Figure 1:
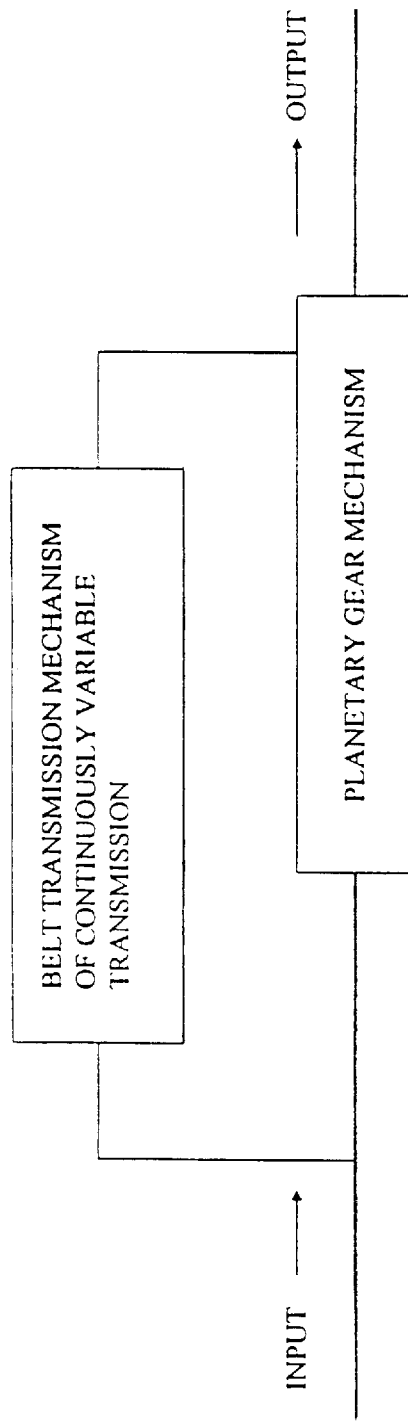
FIG. 1 illustrates the transmission modes according to the present invention.
Figure 2:
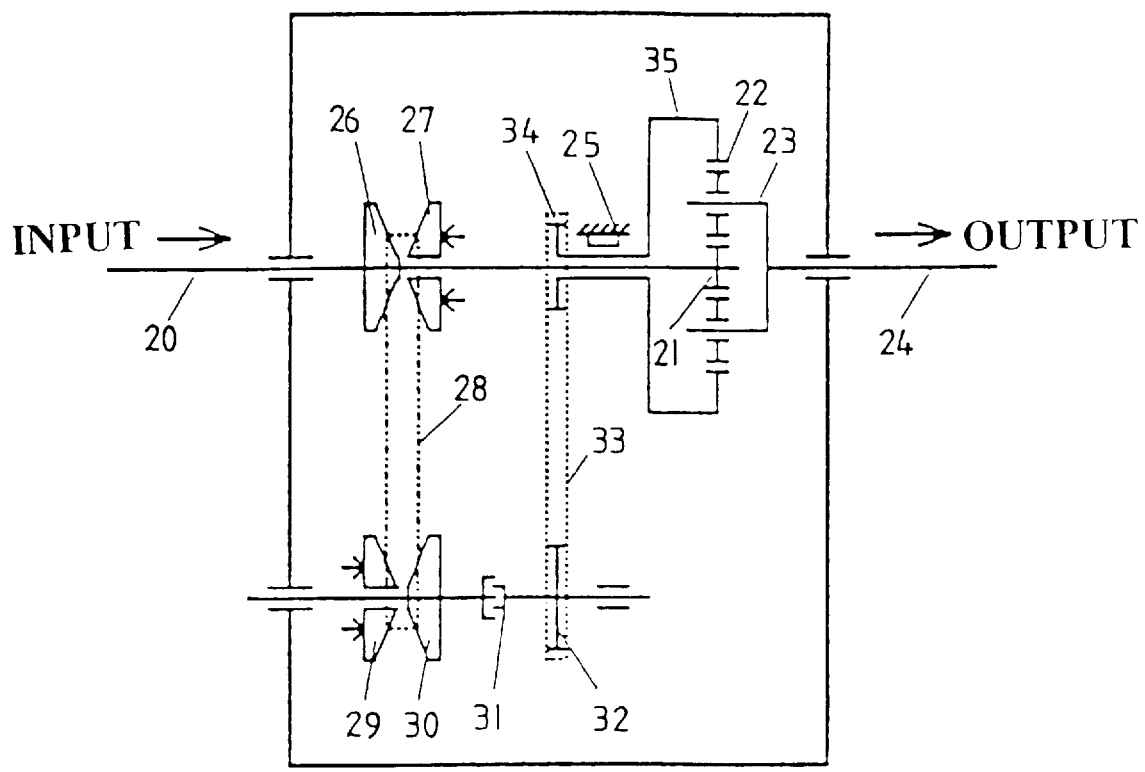
FIG. 2 shows one embodiment of the dual transmission according to the present invention.

FIG. 2 shows a dual transmission according to the present invention, in which the first gear is of fixed speed ratio. The operation of this transmission outlined hereinafter. When the clutch 31 is disconnected, the lock means 25 is operated to lock the internal gear 35 of the planetary gear mechanism; engine power is transmitted from the input shaft 20 to the sun gear 21, and then to the output shaft 24 through the planet gears 22 and the planet gear arm 23. Because the clutch 31 is disconnected, the planetary gear mechanism serves the first gear fixed gear ratio transmission. When the revolving speed of the engine reaches a certain value, the clutch 31 is connected, and the lock means 25 does not function. At this stage, engine power from the input shaft 20 is transmitted through two routes. One route goes through the first belt wheel set 26 and 27, the belt 28, the second belt wheel set 29 and 30, the clutch 31, the second gear 32, the chain 33, the first gear 34, the internal gear 35 of the planetary gear mechanism, the planet gears 22, the planet gear arm 23, and then to the output shaft 24 and the wheels of the motorcycle. The other route goes directly to the sun gear 21, then to the output shaft 24 and the wheels of the motorcycle via the planet gears 22 and the planet gear arm 23. Under this stage, the power transmission of the motorcycle can be controlled by the belt transmission mechanism to achieve the continuously variable transmission mode. The change of the speed ratio of the belt transmission mechanism and the coupling of the clutch can be controlled through a mechanical control, an electric control, or a hydraulic control.

Figure 3:
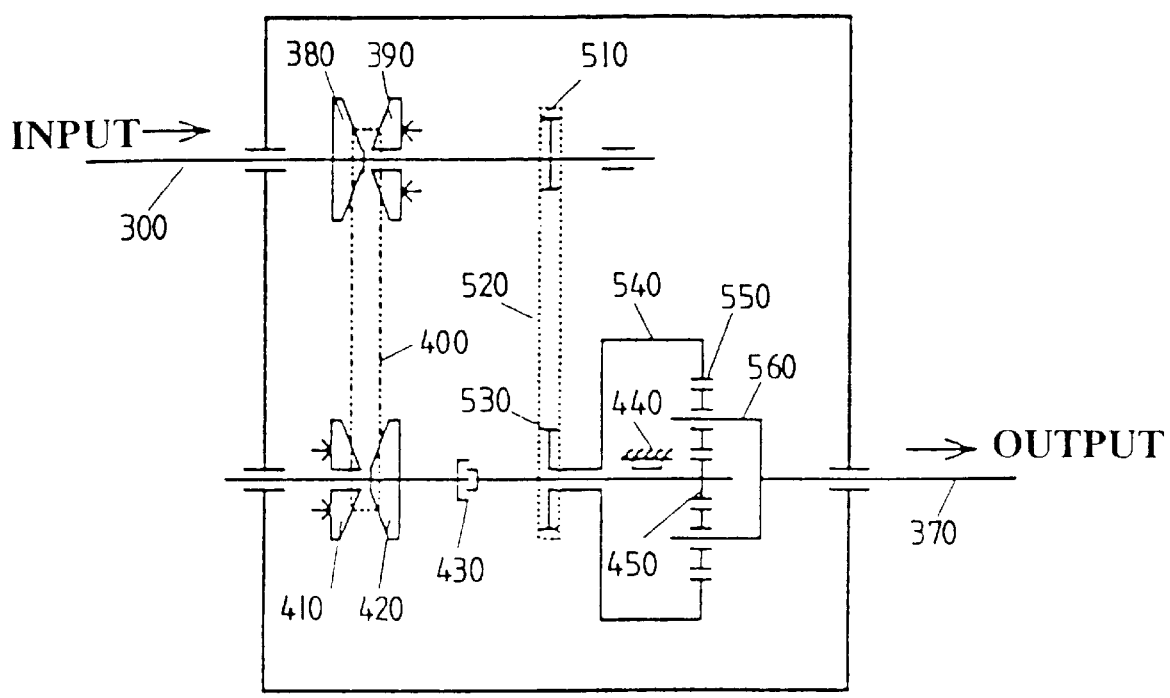
FIG. 3 shows an alternate form of the dual transmission according to the present invention.

FIG. 3 shows an alternate form of the dual transmission according to the present invention, in which the power transmission can be done through two routes, namely, the first gear fixed gear ratio transmission mode, and the power-split continuously variable transmission mode.

(1) The first gear fixed gear ratio transmission mode: When the clutch 430 is disconnected, the lock means 440 is operated to lock the sun gear 450, and engine power is transmitted from the input shaft 300 through the first gear 310, the chain 320, the second gear 330, the internal gear 340 of the planetary gear mechanism, the planet gears 350, and the planet gear arm 360, and then to the output shaft 370.

(2) The power-split continuously variable transmission mode: When the clutch 430 is coupled, the lock means 440 does not function. At this stage, engine power from the input shaft 300 is transmitted through two routes. One route goes through the first gear 310, the chain 320, the second gear 330, the internal gear 340 of the planetary gear mechanism, the planet gears 350, and the planet gear arm 360, and then to the output shaft 370. The other route goes through the first belt wheel set 380 and 390, the belt 400, the belt 400, the second belt wheel set 410 and 420, the clutch 430, the sun gear 450 of the planetary gear mechanism, the planet gears 350, the planet gear arm 360, and then to the output shaft 370.

Figure 4:
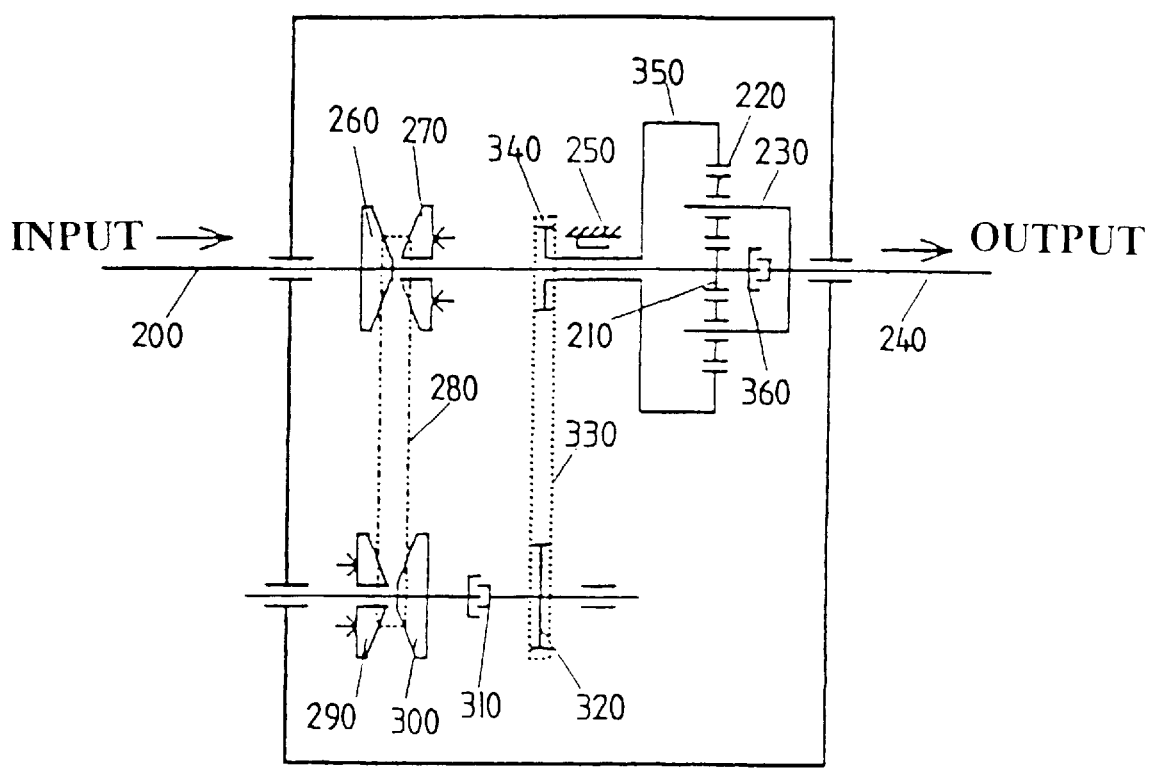
FIG. 4 shows another alternate form of the dual transmission according to the present invention.

FIG. 4 shows another alternate form of the dual transmission according to the present invention, in which the first and second gears are of fixed speed ratio; two clutches and a lock means are used to control the planetary gear mechanism for the two gears fixed gear ratio transmission, and a belt transmission mechanism for power-split continuously variable transmission; the operational modes of the clutches and the lock means are shown in Table I. The power transmission routes of this dual transmission are as follows:

(1) The first gear fixed gear ratio transmission mode: When the first and second clutches 510 and 560 disconnected, the lock means 250 is operated to lock the internal gear 550 of the planetary gear mechanism, and engine power is transmitted from the input shaft 200 through the sun gear 210 of the planetary gear mechanism, the planet gears 220, and the planet gear arm 230, and then to the output shaft 240.

(2) The second gear fixed gear ratio transmission mode: When the first clutch 310 and lock means 250 disconnected and the second clutch 360 is connected, engine power is transmitted from the input shaft 200 to the output shaft 240 through the whole assembly of the planetary gear mechanism.

(3) The power-split continuously variable transmission mode: When the first clutch 310 is coupled and the second clutch 360 with the lock means 250 do not function, engine power is transmitted in two routes. One route goes from the input shaft 200 through the sun gear 210 of the planetary gear mechanism, the planet gears 220, the planet gear arm 230, and then to the output shaft 240. The other route goes from the input shaft 200 through the first belt wheel set 260 and 270, the belt 280, the second belt wheel set 290 and 300, the first clutch 310, the second gear 520, the chain 530, the first gear 540, the internal gear 350 of the planetary gear mechanism, the planet gears 220, and the planet gear arm 230, and then to the output shaft 240.

Figure 5:
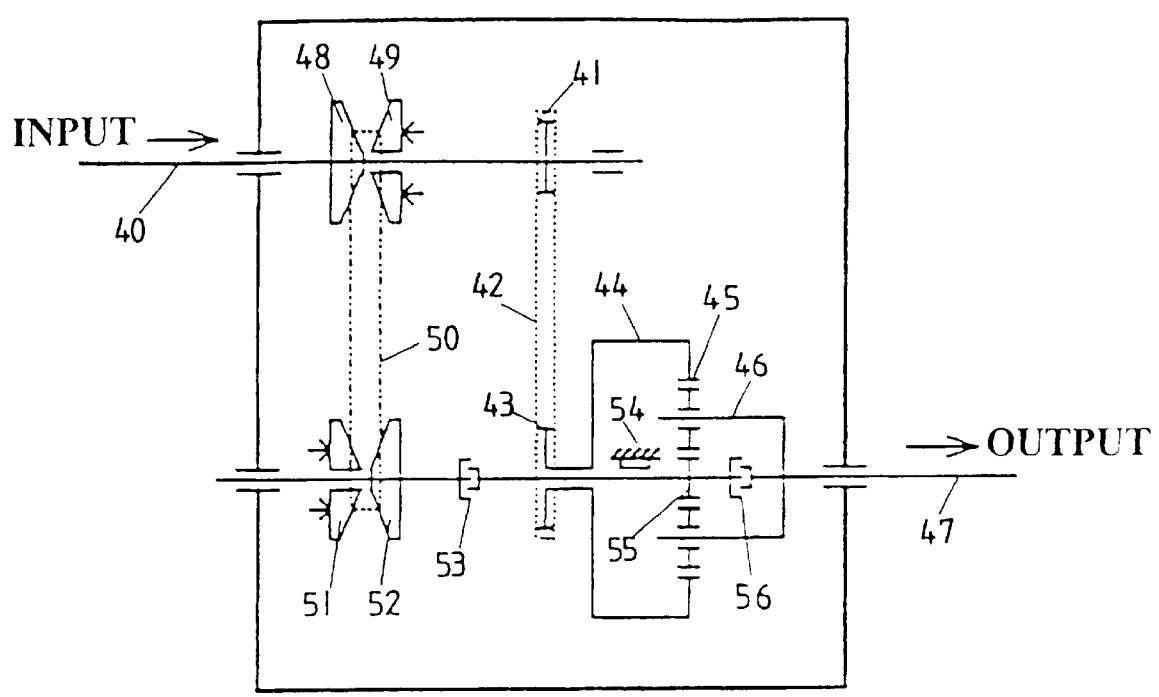
FIG. 5 shows still another alternate form of the dual transmission according to the present invention.

FIG. 5 shows still another alternate form of the dual transmission according to the present invention, in which the first and second gears are of fixed speed ratio; two clutches and a lock means are used to control the planetary gear mechanism for the two gears shift fixed gear ratio transmission, and a belt transmission mechanism for power-split continuously variable transmission; the operational modes of the clutches and the lock means are shown in Table 2. The power transmission routes of this dual transmission are as follows:

(1) The first gear fixed gear ratio transmission mode: When the first and second clutches 53 and 56 are disconnected, the lock means 54 is operated to lock the sun gear 55 of the planetary gear mechanism, and engine power is transmitted from the input shaft 40 through the first gear 41, the chain 42, the second gear 43, the internal gear 44 of the planetary gear mechanism, the planet gears 45, and the planet gear arm 46, and then to the output shaft 47.

(2) The second gear fixed gear ratio transmission mode: When the first clutch 53 and lock means 54 are disconnected and the second clutch 56 is coupled, engine power is transmitted from the input shaft 40 through the first gear 41, the chain 42, the second gear 43, and the whole assembly of the planetary gear mechanism, and then to the output shaft 47.

(3) The power-split continuously variable transmission mode: When the second clutch 56 and lock means 54 are disconnected and the first clutch 53 is coupled, the engine power transmitted in two routes. One route goes from the input shaft 40 through the first gear 41, the chain 42, the second gear 43, the internal gear 44 of the planetary gear mechanism, the planet gears 45, and the planet gear arm 46, and then to the output shaft 47. The other route goes from the input shaft 40 through the first belt wheel set 48 and 49, the belt 50, the second belt wheel set 51 and 52, the first clutch 53, the sun gear 55 of the planetary gear mechanism, the planet gears 45, and the planet gear arm 46, and then to the output shaft 47.

As indicated, the present invention provides a dual transmission which combines a fixed gear ratio transmission and a power-split continuously variable transmission in one assembly to improve the power transmission efficiency and to increase the range of the speed ratio. However, it is to be understood that the drawings are designed for purposes of illustration only, and are not intended as a definition of the limits and scope of the invention disclosed.

We claim:

1. A dual transmission coupled between a power input shaft and power output shaft of a motorcycle for providing a fixed gear ratio transmission mode and a power split continuously variable transmission mode, said dual transmission comprising:

a shell having a first axle and a second axle on the inside;

a belt transmission mechanism capable of continuously changing speed ratio, said belt transmission mechanism comprising a first belt wheel set mounted on said first axle, a second belt wheel set mounted on said second axle, and a belt mounted on said first belt wheel set and said second belt wheel set;

a planetary gear mechanism mounted on one of said first axle and said second axle, said planetary gear mechanism comprising an internal gear, a sun gear, at least two planet gears meshed between said internal gear and said sun gear, and a planet gear arm connected between said planet gears and coupled to said power output shaft;

lock means disposed adjacent to said planetary gear mechanism and controlled to lock a gear of said planetary gear mechanism;

a gear set consisting of a first gear and a second gear respectively mounted on said first axle and said second axle and coupled by a chain, one of the gears of said gear set being connected with the internal gear of said planetary gear mechanism; and a first clutch means disposed between said second belt wheel set and said second gear and controlled to couple said second belt wheel set to said second gear so that when the motorcycle is initially started, output power is transmitted through the planetary gear mechanism to an output shaft and when in a high speed mode, output power is transmitted by the operation of the first clutch means and the lock means in two routes, respectively, through the planetary gear mechanism and the belt transmission mechanism.

2. The dual transmission of claim 1 wherein said planetary gear mechanism is mounted on said first axle.

3. The dual transmission of claim 1 wherein said planetary gear mechanism is mounted on said second axle.

4. The dual transmission of claim 2 wherein said lock means is fixed to the internal gear of said planetary gear mechanism.

5. The dual transmission of claim 3 wherein said lock means is fixed to the sun gear of said planetary gear mechanism.

6. The dual transmission of claim 1 further comprising a second clutch means controlled to couple said sun gear to said planet gear arm.

7. A dual transmission coupled between a power input shaft and power output shaft of a motorcycle, comprising:

a shell having a first axle and a second axle on the inside;

a belt transmission mechanism capable of continuously changing speed ratio, said belt transmission mechanism comprising a first belt wheel set mounted on said fist axle, a second belt wheel set mounted on said second axle, and a belt mounted on said first belt wheel set and said second belt wheel set;

a planetary gear mechanism mounted on the first axle of said shell, said planetary gear mechanism comprising an internal gear, a sun gear, at least two planet gears meshed between said internal gear and said sun gear, and a planet gear arm connected between said planet gears and coupled to said power output shaft;

lock means disposed adjacent to said planetary gear mechanism and controlled to lock the internal gear of said planetary gear mechanism;

a gear set consisting of a first gear and a second gear respectively mounted on said first axle and said second axle and coupled by a chain, said first gear being connected with the internal gear of said planetary gear mechanism; and a first clutch means disposed between said second belt wheel set and said second gear and controlled to couple said second belt wheel set to said second gear.

8. The dual transmission of claim 7 further comprising a second clutch means controlled to couple said sun gear to said planet gear arm.

9. A dual transmission coupled between a power input shaft and power output shaft of a motorcycle for providing a fixed gear ratio transmission mode and a power split continuously variable transmission mode, said dual transmission comprising:

a shell having a first axle and a second axle on the inside;

a belt transmission mechanism capable of continuously changing speed ratio, said belt transmission mechanism comprising a first belt wheel set mounted on said first axle, a second belt wheel set mounted on said second axle, and a belt mounted on said first belt wheel set and said second belt wheel set;

a planetary gear mechanism mounted on the second axle of said shell, said planetary gear mechanism comprising an internal gear, a sun gear, at least two planet gears meshed between said internal gear and said sun gear, and a planet gear arm connected between said planet gears and coupled to said power output shaft;

lock means disposed adjacent to said planetary gear mechanism and controlled to lock the sun gear of said planetary gear mechanism;

a gear set consisting of a first gear and a second gear respectively mounted on said first axle and said second axle and coupled by a chain, said second gear being meshed with the internal gear of said planetary gear mechanism; and a first clutch means disposed between said second belt wheel set and said second gear and controlled to couple said second belt wheel set to said second gear so that when the motorcycle is initially started, output power is transmitted through the planetary gear mechanism to an output shaft and when in a high speed mode, output power is transmitted by the operation of the first clutch means and the lock means in two routes, respectively, through the planetary gear mechanism and the belt transmission mechanism.

10. The dual transmission of claim 9 further comprising a second clutch means controlled to couple said sun gear to said planet gear arm.

11. A dual transmission coupled between a power input shaft and power output shaft of a motorcycle, comprising a fixed gear ratio planetary gear mechanism, and a belt transmission mechanism capable of continuously changing speed ratio, said belt transmission mechanism comprising two axles, at least two belt wheel sets respectively mounted on said axles, and a belt mounted on said at least two belt wheel sets, said planetary gear mechanism being mounted on said axles, said axles being coupled by a chain, the engine power of the motorcycle being transmitted from said power input shaft to said power output shaft through said planetary gear mechanism when the motorcycle is initially started or operated at a low speed mode, the engine power of the motorcycle being transmitted from said power input shaft to said power output shaft through said planteary gear mechanism and said belt transmission mechanism when the motorcycle is operated at a medium speed mode or a high speed mode.

* * * * *